United States Patent
Katagiri et al.

(10) Patent No.: US 6,981,798 B2
(45) Date of Patent: Jan. 3, 2006

(54) SLIDING BEARING

(75) Inventors: Takeshi Katagiri, Inuyama (JP);
Yutaka Okamoto, Inuyama (JP);
Takayuki Shibayama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 73 days.

(21) Appl. No.: 10/360,912

(22) Filed: Feb. 10, 2003

(65) Prior Publication Data

US 2003/0185471 A1 Oct. 2, 2003

(30) Foreign Application Priority Data

Mar. 27, 2002 (JP) ......................................... 2002-087532

(51) Int. Cl.
*F16C 33/06* (2006.01)

(52) U.S. Cl. ...................................................... 384/294

(58) Field of Classification Search ................ 384/273, 384/277–296
See application file for complete search history.

(56) References Cited

U.S. PATENT DOCUMENTS

| | | | | |
|---|---|---|---|---|
| 5,707,155 A | * | 1/1998 | Banfield et al. | ............ 384/294 |
| 6,055,884 A | * | 5/2000 | Lantz et al. | ................. 384/294 |
| 2002/0131657 A1 | * | 9/2002 | Inoue et al. | ................. 384/276 |

* cited by examiner

*Primary Examiner*—Lenard A. Footland
(74) *Attorney, Agent, or Firm*—Browdy and Neimark, P.L.L.C.

(57) ABSTRACT

In a cylindrical sliding bearing, a radial rigidity of an inner circumferential surface of a sliding layer against a radial compression force applied to the inner circumferential surface by a shaft varies in a circumferential direction so that the inner circumferential surface includes a relatively-high radial rigidity bearing area and a relatively-low radial rigidity bearing area.

9 Claims, 12 Drawing Sheets

SLIDING BEARING

BACKGROUND OF THE INVENTION

The present invention relates to a sliding bearing to be fitted in a housing bore.

A prior art sliding bearing has a bearing cylindrical layer including an inner circumferential surface for supporting a shaft, and an outer circumferential surface, and a backing metal cylindrical layer contacting the outer circumferential surface to surround the bearing metal cylindrical layer.

BRIEF SUMMARY OF THE INVENTION

An object of the present invention is to provide a sliding bearing in which a pressure applied to an inner surface of the sliding bearing for supporting a shaft thereon in a movable manner (preferably through a liquid lubricant between the inner surface and the shaft) is restrained from locally increasing significantly on the inner surface.

According to the present invention, in a cylindrical sliding bearing for supporting a shaft in a movable manner in the sliding bearing with a hydrodynamic lubrication between the shaft and the sliding bearing when the sliding bearing is fitted in a cylindrical surface of a housing bore, comprising, a sliding layer including an inner circumferential surface for facing to the shaft so that the shaft is supported on the inner circumferential surface in the movable manner, and an outer circumferential surface, and a backing layer joined with the outer circumferential surface to surround the sliding layer, a radial rigidity of the inner circumferential surface against a radial compression force applied to the inner circumferential surface by the shaft varies in a circumferential direction so that the inner circumferential surface includes a relatively-high radial rigidity bearing area and a relatively-low radial rigidity bearing area.

Since the radial rigidity of the inner circumferential surface against the radial compression force applied to the inner circumferential surface by the shaft varies in the circumferential direction so that the inner circumferential surface includes the relatively-high radial rigidity bearing area and the relatively-low radial rigidity bearing area, a pressure generated on the inner circumferential surface is restrained from locally increasing significantly on the inner circumferential surface, by arranging the relatively-low radial rigidity bearing area at a circumferential position (for example, a position indicated by "A", "B" or "C" in FIG. 1) on the inner circumferential surface at which circumferential position the pressure generated on the inner circumferential surface locally increases significantly so that the local significant increase of the pressure generated on the inner circumferential surface is absorbed by distributing the local pressure increase over a wide region by the low radial rigidity of the relatively-low radial rigidity bearing area.

The radial compression force may be applied to the inner circumferential surface through a liquid-lubricant film pressure by the shaft.

If a radial rigidity of the cylindrical surface of the housing bore against the radial compression force applied to the cylindrical surface through the sliding bearing by the shaft varies in the circumferential direction so that the cylindrical surface includes a relatively-high radial rigidity housing area (for example, as indicated by "A", "B" or "C" in FIG. 1) and a relatively-low radial rigidity housing area (for example, an area other than the areas indicated by "A", "B" and "C" in FIG. 1), it is preferable for restraining the pressure applied to the inner circumferential surface from locally increasing significantly on the inner circumferential surface that the relatively-low radial rigidity bearing area is adapted to overlap the relatively-high radial rigidity housing area at least partially as seen radially.

If a radial rigidity of the cylindrical surface of the housing bore against the radial compression force applied to the cylindrical surface through the sliding bearing by the shaft varies in the circumferential direction so that the cylindrical surface includes a maximum radial rigidity point (for example, as indicated by "a" in FIG. 12) at which point the radial rigidity of the cylindrical surface is maximum, it is preferable for restraining the pressure applied to the inner circumferential surface from locally increasing significantly on the inner circumferential surface the relatively-low radial rigidity bearing area is adapted to overlap that the maximum radial rigidity point as seen radially.

If the radial compression force applied to the inner circumferential surface by the shaft varies in the circumferential direction so that the inner circumferential surface has a maximum bearing pressure point (for example, as indicated by "a" in FIG. 12) at which point a radial compression pressure generated by the radial compression force on the inner circumferential surface is maximum, it is preferable for restraining the pressure applied to the inner circumferential surface from locally increasing significantly on the inner circumferential surface that the relatively-low radial rigidity bearing area is adapted to overlap the maximum bearing pressure point as seen radially.

If Young's modulus of the sliding layer is lower than Young's modulus of the backing layer, it is preferable for forming the relatively-low and relatively-high radial rigidity bearing areas that a thickness of the sliding layer at the relatively-low radial rigidity bearing area is larger than a thickness of the sliding layer at the relatively-high radial rigidity bearing area, and/or that the thickness of the backing layer under the relatively-low radial rigidity bearing area is smaller than the thickness of the backing layer under the relatively-high radial rigidity bearing area.

If the housing bore is included by a first member to be mounted on a second member, the radial rigidity of the inner circumferential surface is a ratio of the radial compression force applied to the inner circumferential surface by the shaft to a radial elastic displacement of the shaft at the inner circumferential surface along a direction of the radial compression force (=(the radial compression force applied to the inner circumferential surface by the shaft)/(a radial elastic displacement of the shaft at the inner circumferential surface along a direction of the radial compression force), obtainable when the shaft is supported on the inner circumferential surface, the sliding bearing is fitted in the cylindrical surface, the radial elastic displacement of the shaft is generated in accordance with the radial compression force applied to the inner circumferential surface by the shaft, and the first member is mounted on the second member.

If the housing bore is included by the first member to be mounted on the second member, and a radial rigidity of the cylindrical surface against the radial compression force applied to the cylindrical surface through the sliding bearing by the shaft varies in the circumferential direction, the radial rigidity of the cylindrical surface is a ratio of the radial compression force applied to the cylindrical surface through the sliding bearing by the shaft to a radial displacement of the sliding bearing at the cylindrical surface along a direction of the radial compression force (=(the radial compression force applied to the cylindrical surface through the sliding bearing by the shaft)/(a radial displacement of the sliding bearing at the cylindrical surface along a direction of the radial compression force)), obtainable when the shaft is supported on the inner circumferential surface, the sliding bearing is fitted in the cylindrical surface, the radial elastic displacement of the sliding bearing is generated in accordance with the radial compression force applied to the cylindrical surface through the sliding bearing by the shaft, and the first member is mounted on the second member.

Calculation, simulation or experimental analysis for determining the radial rigidity of the cylindrical surface and/or the inner circumferential surface may be brought about with consideration of a liquid-lubricant hydrodynamic pressure between the shaft and the inner circumferential surface or without consideration of the liquid-lubricant hydrodynamic pressure therebetween.

It is preferable that the relatively-low radial rigidity bearing area is adapted to be arranged at a circumferential position on the inner circumferential surface at which circumferential position a pressure generated on the inner circumferential surface for supporting the shaft on the inner circumferential surface locally increases significantly.

DETAILED DESCRIPTION OF THE INVENTION

Figure 1:
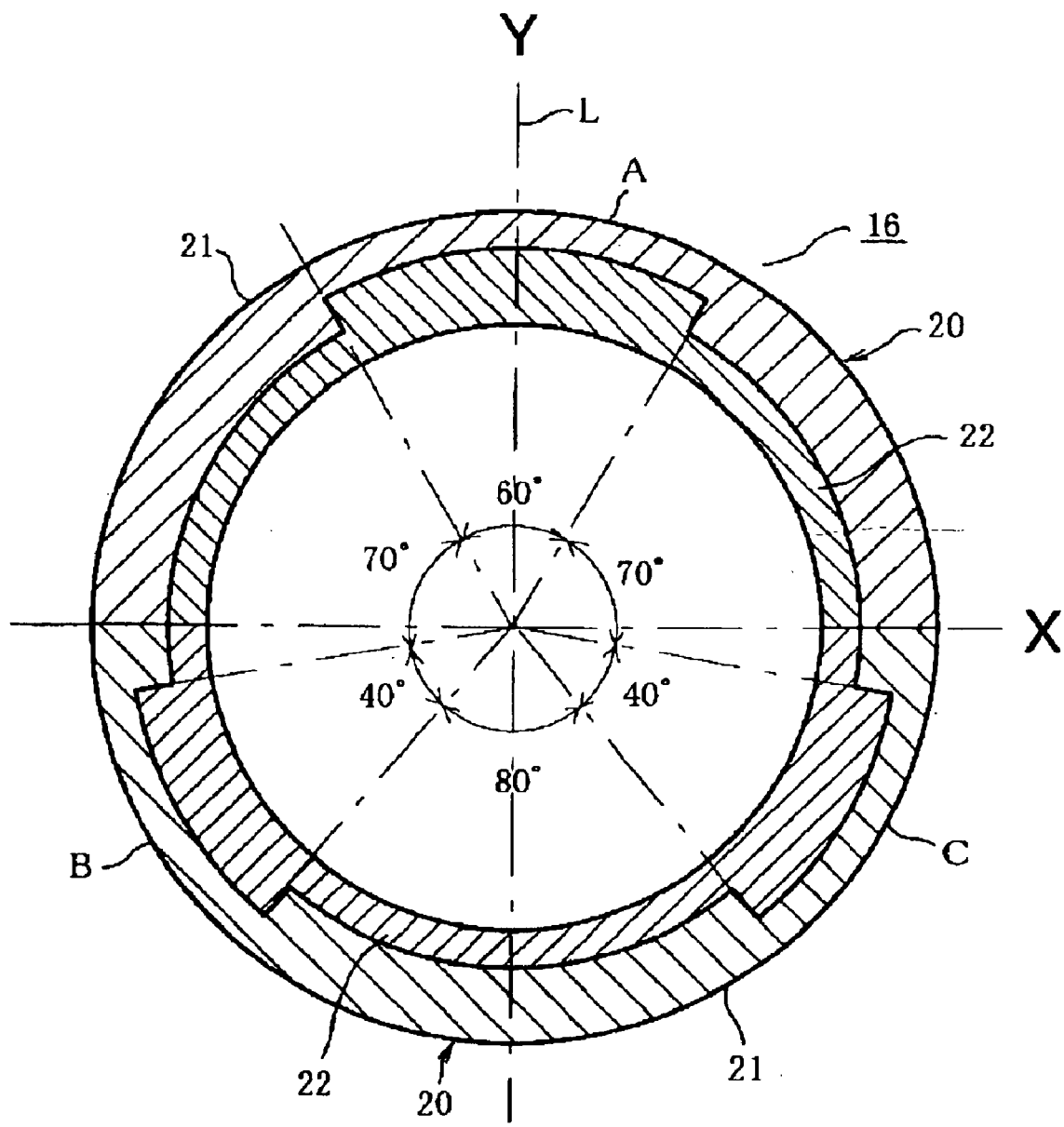
FIG. 1 is a cross sectional view of a sliding bearing of the present invention.
Figure 2:
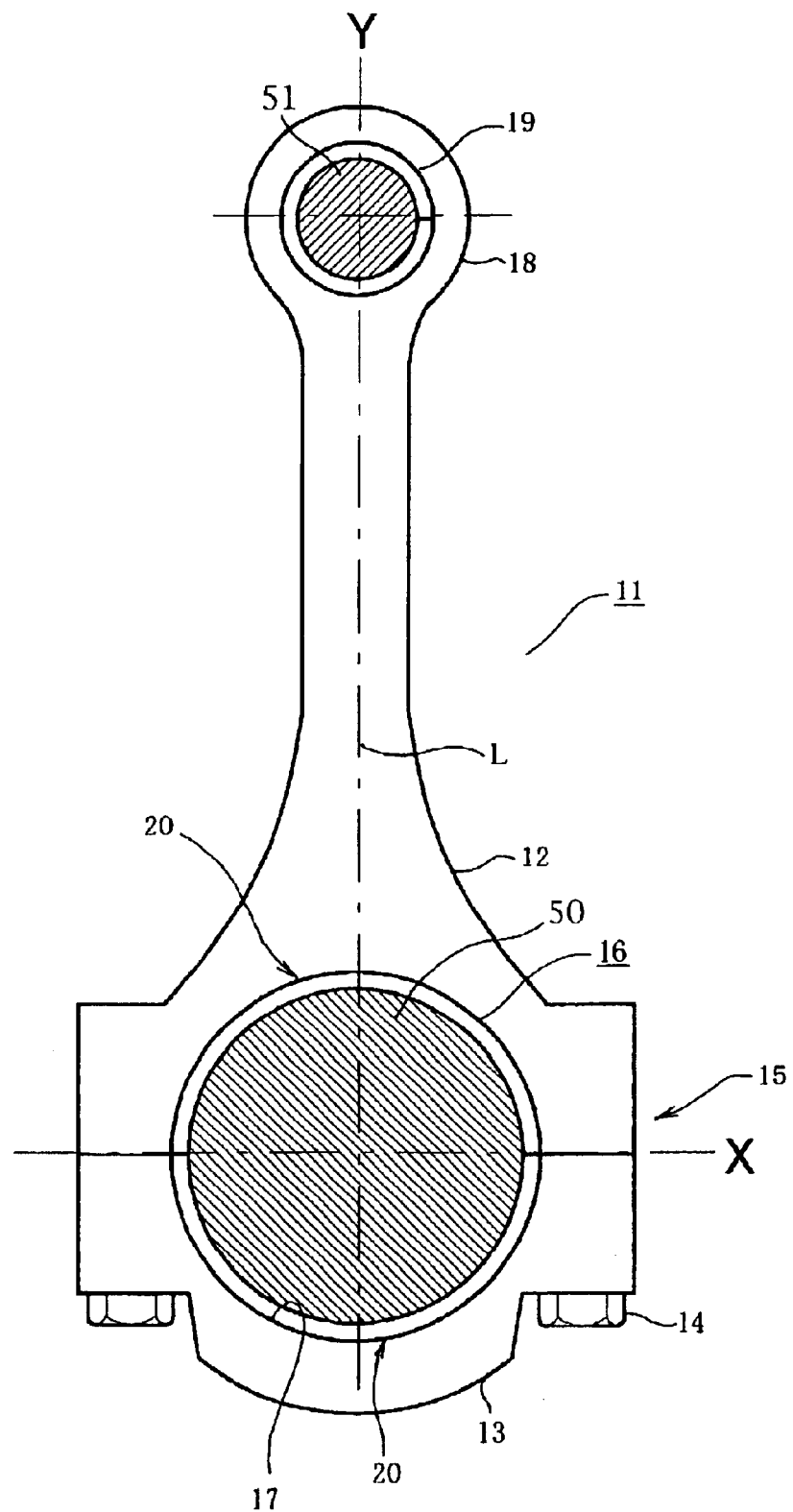
FIG. 2 is a front view of a connecting rod into which the sliding bearing is fitted.
Figure 10:
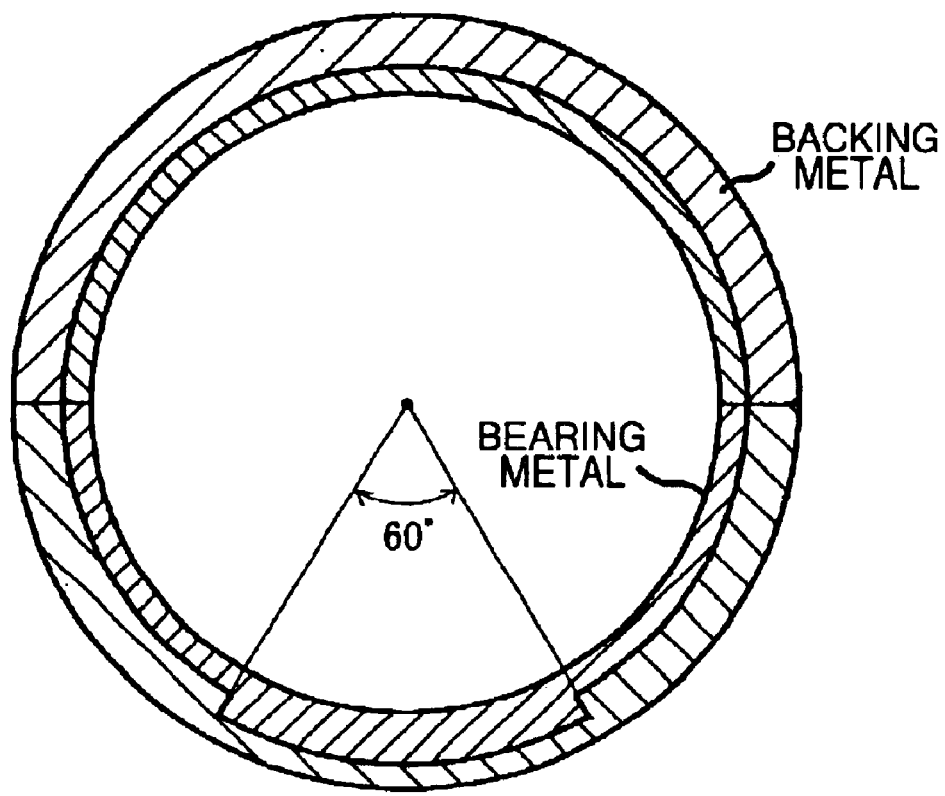
FIG. 10 is a cross sectional view of a sliding bearing of the present invention used for experiment.
Figure 11:
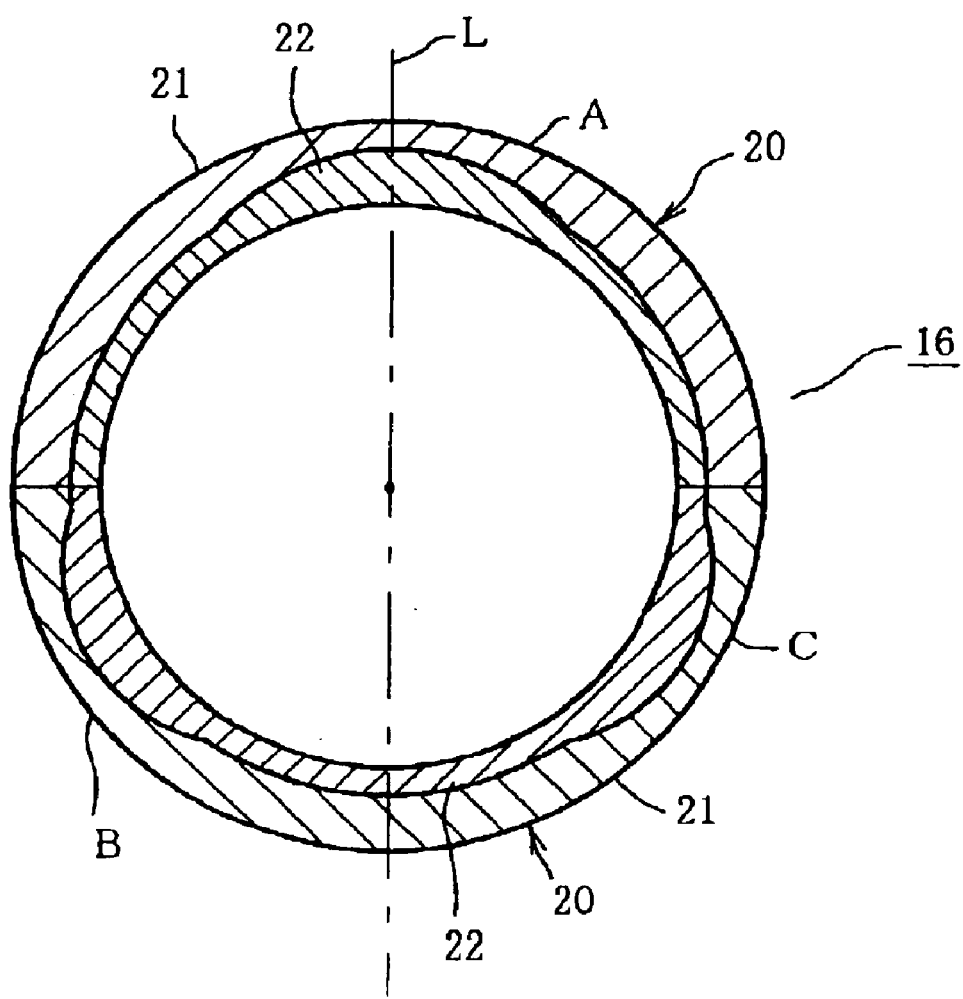
FIG. 11 is a cross sectional view of another sliding bearing of the present invention.

A sliding bearing as shown in each of FIGS. 1, 10 and 11 may be incorporated or fitted in a connecting rod 11 (as the claimed first member) for a combustion engine as shown in FIG. 2. The connecting rod 11 made of a metal (for example, cast iron) includes a rod body 12 and a cap 13 fixed to each other by bolts 14. A large end 15 of the connecting rod 11 formed by the cap 13 and an end of the rod body 12 has a bore 17 for containing therein a sliding bearing 16. The bore 17 is formed by a pair of recesses respectively formed on the rod body 12 and cap 13.

A small end 18 of the connecting rod 11 contains therein a sliding bearing 19 for supporting a piston pin 51 (as the claimed second member) in a rotatable manner.

The sliding bearing 16 for supporting a crank pin 50 (as the claimed shaft) in a rotatable manner is formed by a pair of half bearings 20 facing to and contacting each other through a joint face of the sliding bearing 1 passing a rotational axis of the sliding bearing 16, and the rod body 12 and cap 13 face to and contact each other through a joint face of the connecting rod 11 passing the rotational axis of the sliding bearing 16. The sliding bearing 16 has a backing metal (for example, steel) layer 21 as the claimed backing layer and a Al alloy or Cu alloy bearing metal layer 22 as the claimed sliding layer, and the backing metal layer 21 and bearing metal layer 22 are faced to each other.

Figure 3:
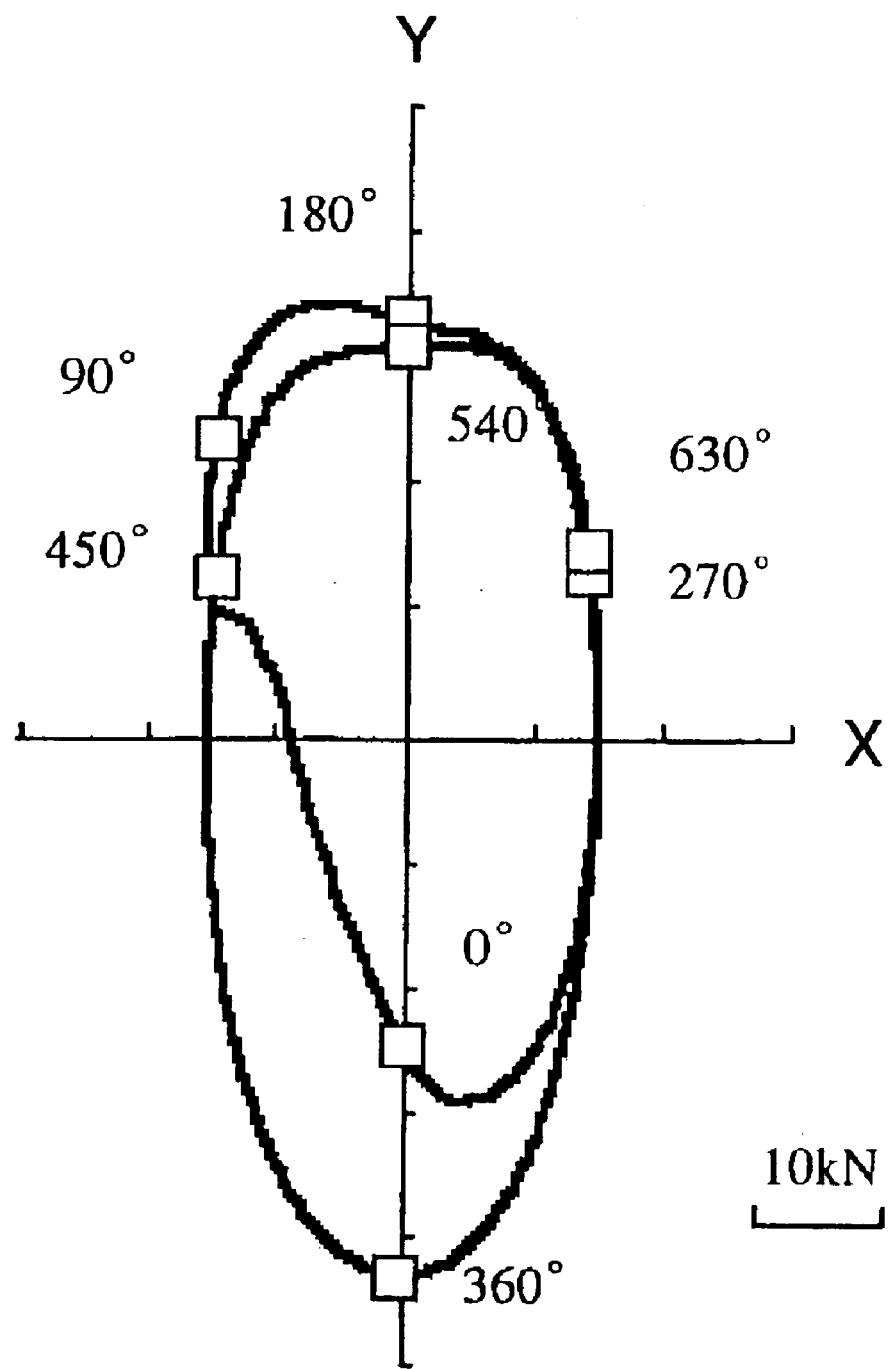
FIG. 3 is a diagram showing a relationship between a rotational angle of a shaft and a polar (directed) load applied to an inner surface of the sliding bearing.

FIG. 3 shows a relationship between a polar (directed) load applied to the sliding bearing 16 and a rotational angle of a crank shaft of four-cycle combustion engine, calculated from a theoretical analysis. The rotational angle is zero degrees when a combustion and expansion stroke starts or a piston is at a top dead center, the rotational angle is 0–180 degrees during the combustion and expansion stroke, the rotational angle is 180–360 degrees during an exhaust stroke, the rotational angle is 360–540 degrees during an intake stroke, and the rotational angle is 540–720 (0) degrees during a compression stroke.

As shown in FIG. 3, a large upward force is applied to the sliding bearing 16 when the rotational angle is 180 degrees and 540 degrees, and a large downward force is applied to the sliding bearing 16 when the rotational angle is 360 degrees.

Figure 4:
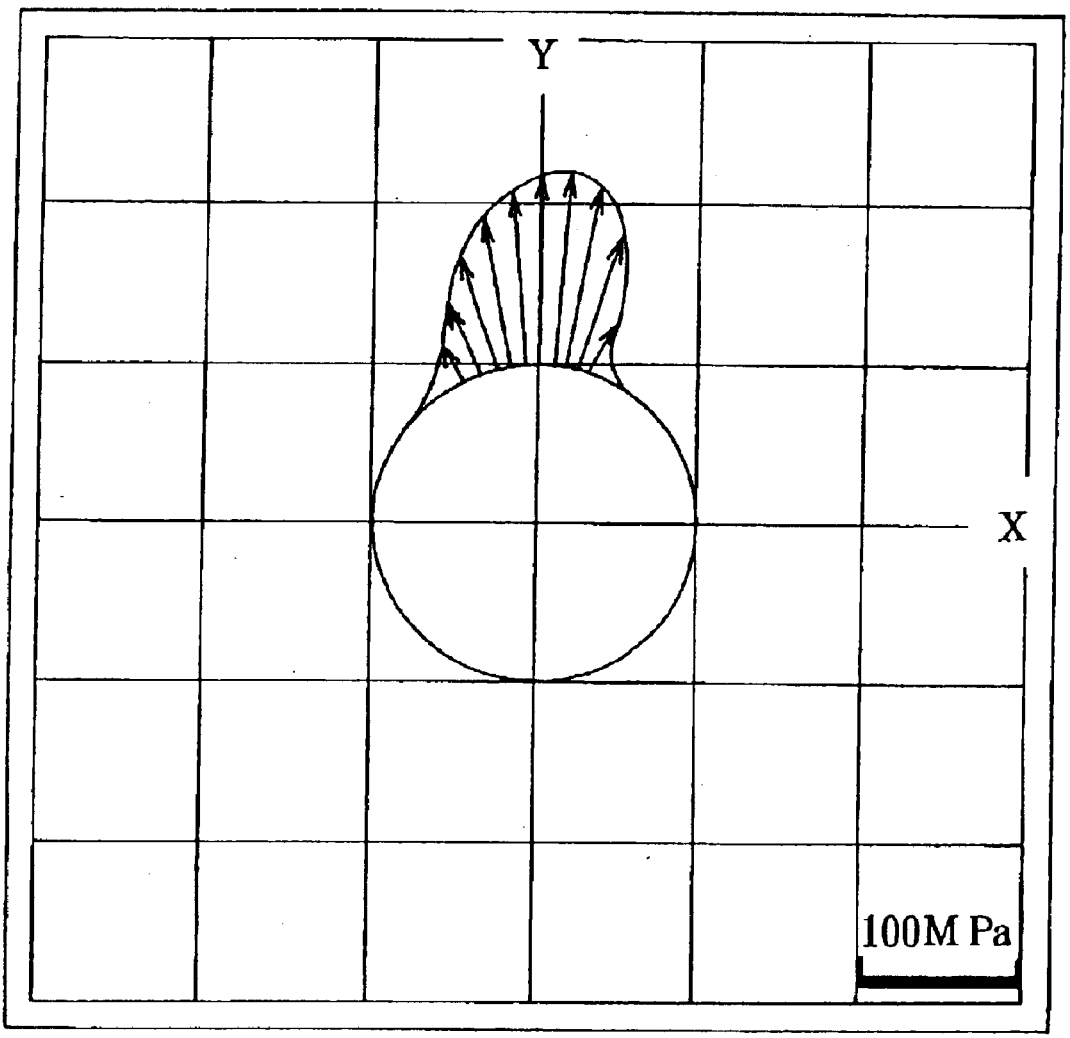
FIG. 4 is a schematic view showing a relationship between a circumferential position of the inner surface of the sliding bearing and an oil film (lubricant) pressure applied to the inner surface as obtained when the rotational angle is 180 degrees.
Figure 5:
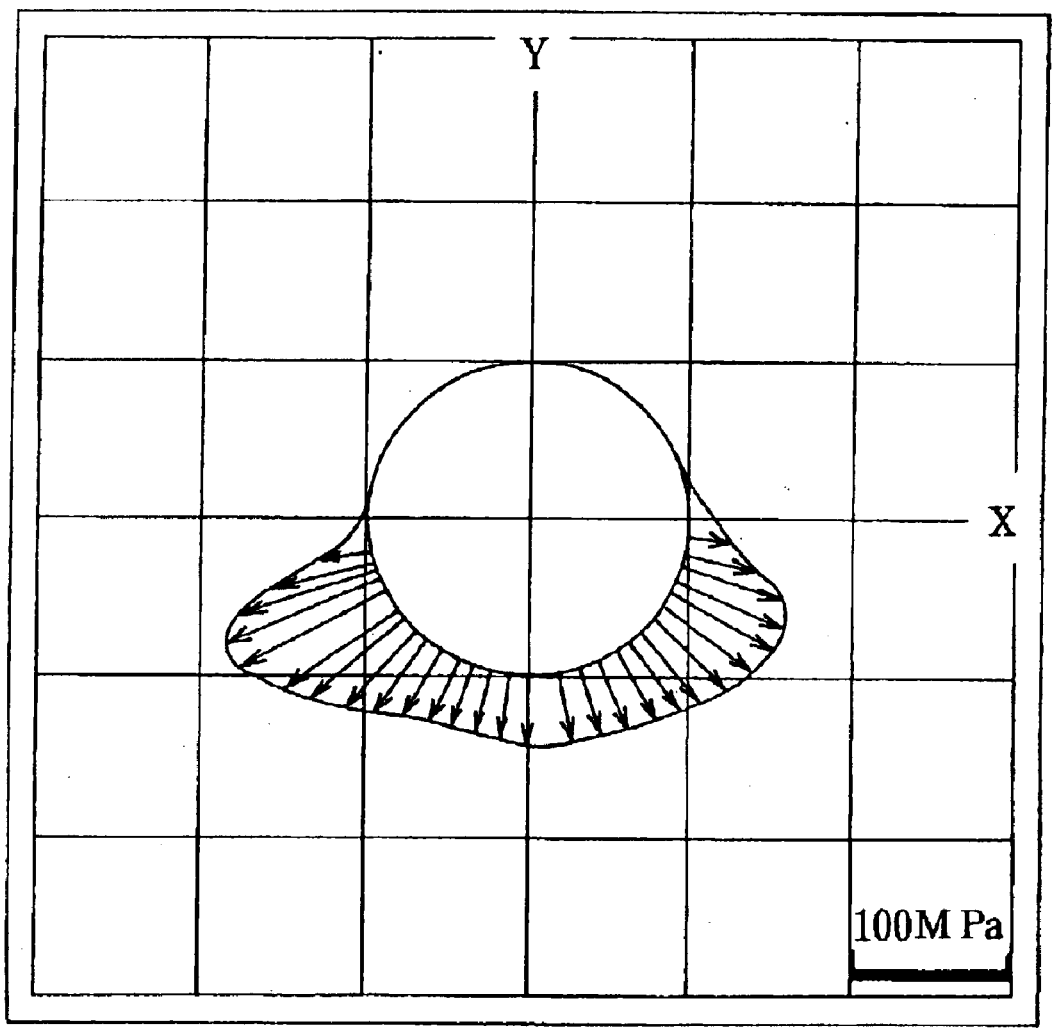
FIG. 5 is a schematic view showing a relationship between the circumferential position of the inner surface of the sliding bearing and the oil film pressure applied to the inner surface as obtained when the rotational angle is 360 degrees.
Figure 6:
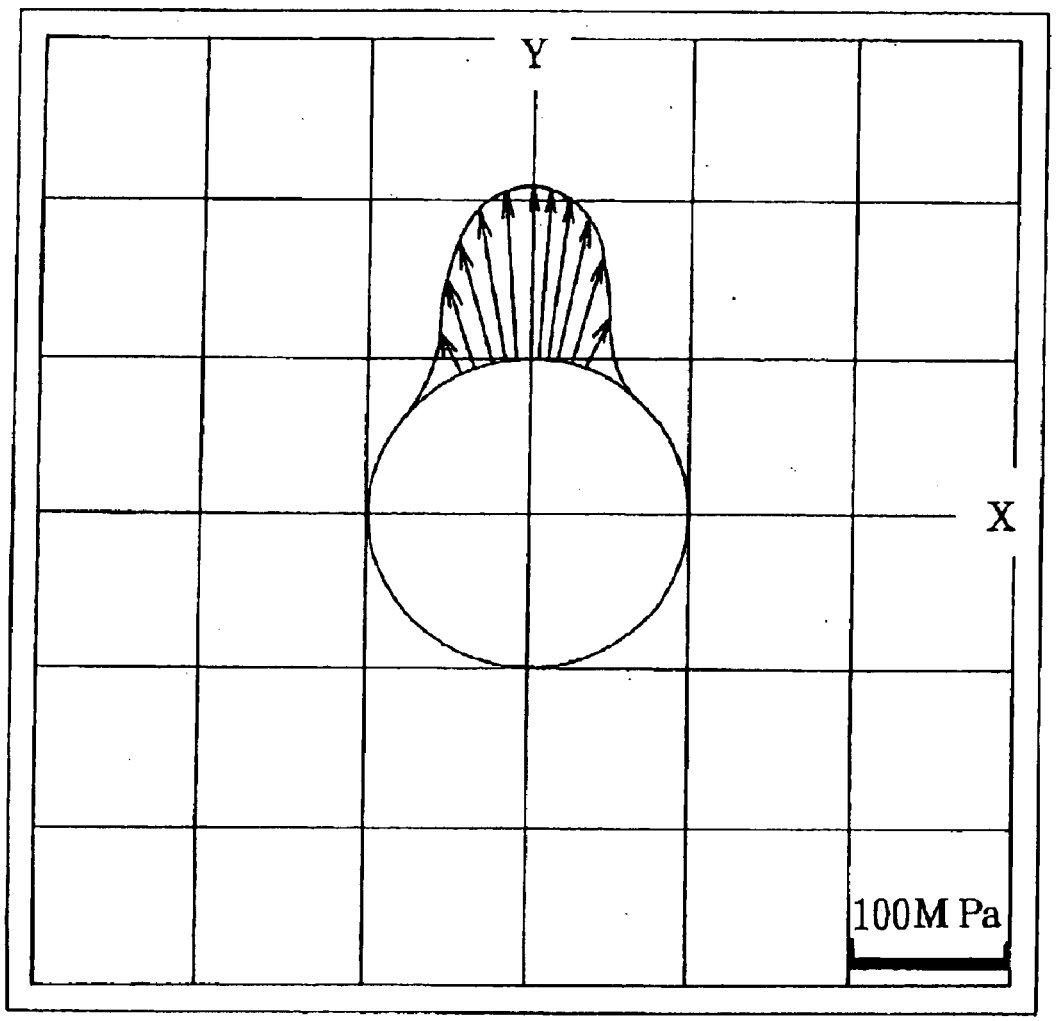
FIG. 6 is a schematic view showing a relationship between the circumferential position of the inner surface of the sliding bearing and the oil film pressure applied to the inner surface as obtained when the rotational angle is 540 degrees.
Figure 12:
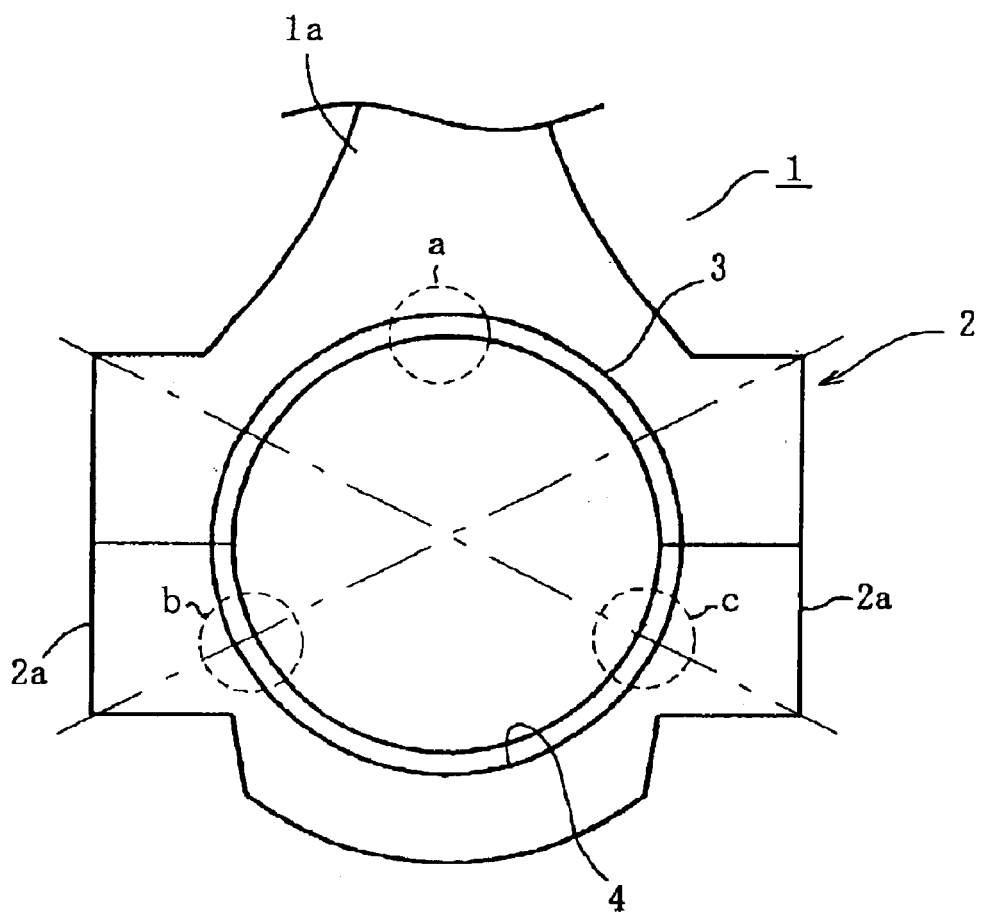
FIG. 12 is a schematic view showing a relatively-high radial rigidity housing area and a relatively-low radial rigidity housing area.

Each of FIGS. 4–6 shows an oil film pressure distribution between the sliding bearing 16 and the crank pin 50, calculated from a theoretical analysis. When the large upward force is applied to the sliding bearing 16, the oil film pressure is significantly high at a top of the sliding bearing as indicated by "a" in FIG. 12 and "A" in FIG. 1. When the large downward force is applied to the sliding bearing 16, the oil film pressure is significantly high at slightly-low left and right position as indicated by "b" and "c" in FIG. 12 and "B" and "C" in FIG. 1. An imaginary line L passes rotational axes of the sliding bearing 16 and 19.

According to the present invention, a radial rigidity of an inner circumferential surface of the bearing metal layer 22 against a radial compression force applied to the inner circumferential surface is decreased at areas of the inner circumferential surface at which the oil film pressure is significantly high, while the radial rigidity is prevented from being decreased at remainder region of the inner circumferential surface other than the areas. Therefore, the radial rigidity of the inner circumferential surface varies in a circumferential direction. The radial rigidity is adjusted by changing a thickness of the bearing metal layer 22 and/or the backing metal layer 21, when Young's modulus of the bearing metal layer 22 is smaller than Young's modulus of backing metal layer 21.

At the circumferential regions A, B and C of the sliding bearing 16, the thickness of the bearing metal layer 22 is made large while the thickness of the backing metal layer 21 is small.

Since the radial rigidity is made low by the thickness adjustment at the circumferential regions A, B and C, the pressure increase at the circumferential regions A, B and C is absorbed by distributing the pressure over a wide range.

Figure 7:
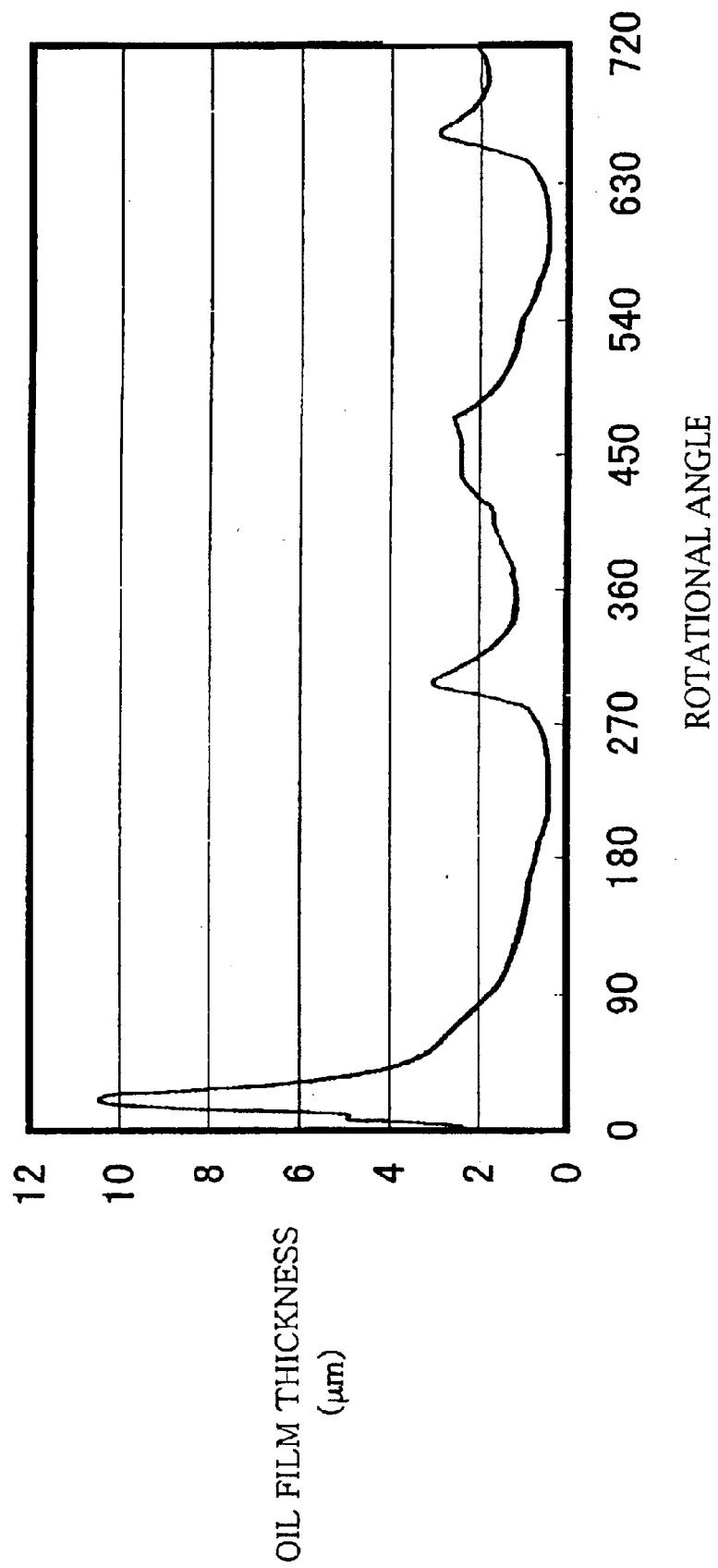
FIG. 7 is a diagram showing a relationship between the rotational angle of the shaft and the oil film thickness.
Figure 8:
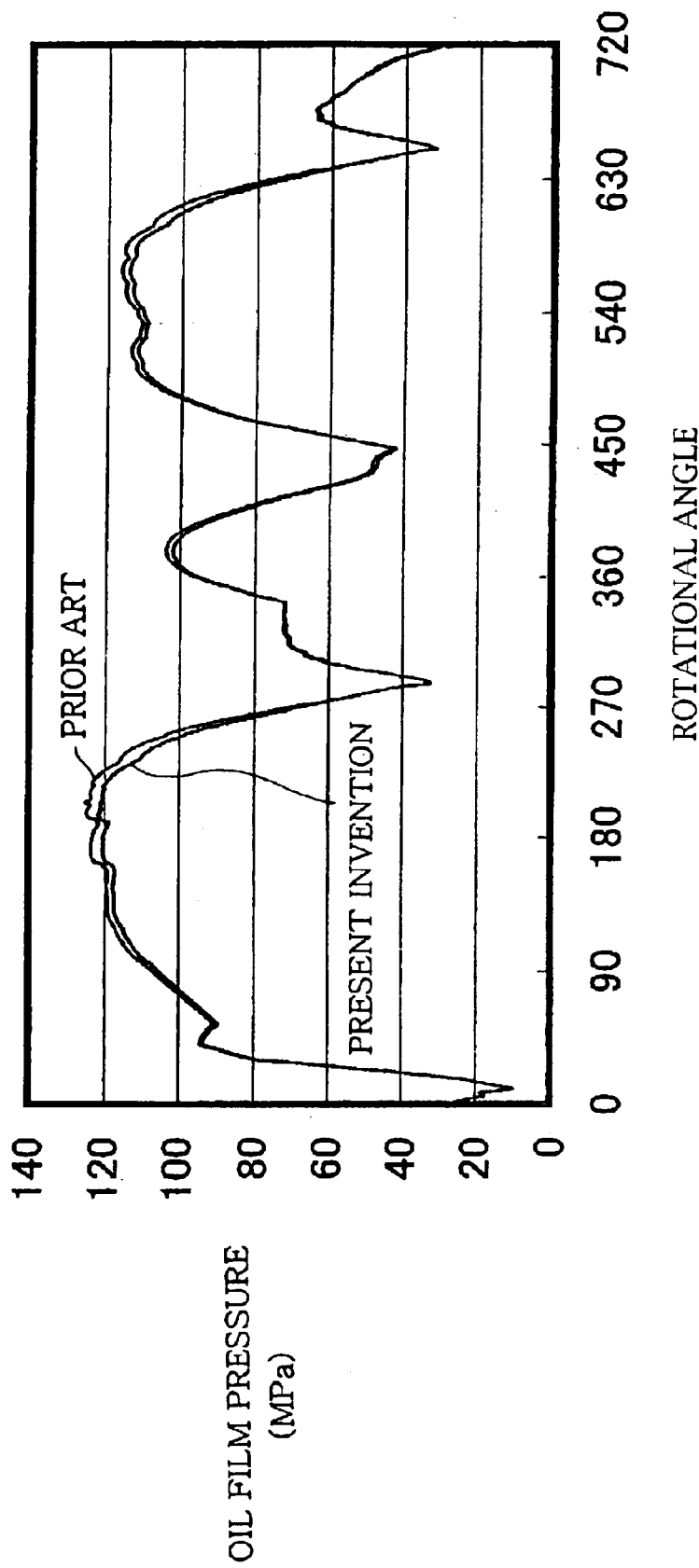
FIG. 8 is a diagram showing a relationship between the rotational angle of the shaft and the oil film pressure.
Figure 9:
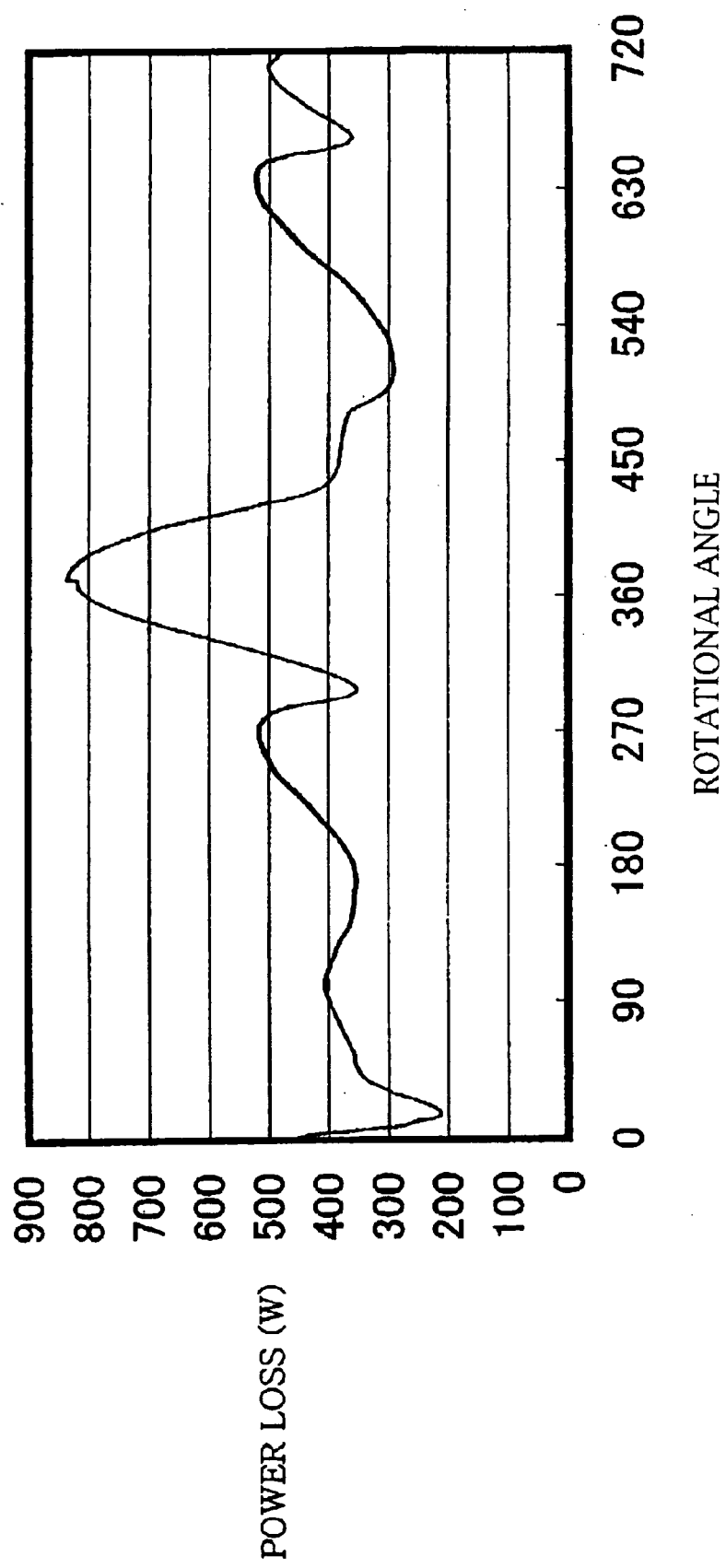
FIG. 9 is a diagram showing a relationship between the rotational angle of the shaft and a power loss in the sliding bearing.

As understood from FIGS. 7–9 showing respectively theoretical analysis's, there is no difference in oil film thickness and power loss between the present claimed sliding bearing and a prior art sliding bearing, but a maximum value of the oil film pressure in the present claimed sliding bearing is smaller than a maximum value of the oil film pressure in the prior art sliding bearing.

An experiment was carried out by a dynamic load type fatigue strength testing apparatus to prove an effect of the present claimed sliding bearing for decreasing the maximum value of the oil film pressure to improve a fatigue strength of the radially inner surface of the sliding bearing. In this experiment, a shaft rotational speed is 3250 rpm, a lubricant is SAE20, a lubricant temperature when being supplied to the sliding bearing is 120° C., an oil film pressure when being supplied to the sliding bearing is 0.29 MPa, and a radial dynamic force applied to the sliding bearing through an oil film by the shaft is 74.6 KN.

A sliding bearing as comparative specimen has an outer diameter of 56 mm, a width of 17 mm, a radial thickness of 1.5 mm, a constant thickness of a backing metal layer of 1.2 mm, and a constant thickness of a bearing metal layer of 0.3 mm. The sliding bearing as invention specimen has, as shown in FIG. 10, a thickness increased bearing metal layer portion of a increased thickness of 0.6 mm extending circumferentially by 60 degrees, while the other dimensions and material of the comparative specimen and the invention specimen are equal to each other respectively.

A result of this experiment shows that a fatigue life of the sample sliding bearing is $1.02 \times 10^8$ cycles, a fatigue life of the present claimed sliding bearing is $1.12 \times 10^8$ cycles, and the fatigue life is improved by the present claimed sliding bearing by 10% in comparison with the sample sliding bearing.

The thickness of the bearing metal layer 22 may change gradually in a circumferential direction, as shown in FIG. 11. The sliding bearing according to the present invention may have a circumferentially constant thickness of the bearing metal layer and a circumferentially changing thickness of the backing metal layer to adjust circumferentially the radial rigidity of the inner surface of the sliding bearing for contacting the shaft to be supported. The backing metal layer may be made of any material (other than steel) of Young's modulus greater than Young's modulus of the bearing metal layer.

What is claimed is:

1. A cylindrical sliding bearing, comprising:
   a. a bearing layer;
   b. a backing layer;
   c. the bearing layer including a first circumferential surface forming a shaft supporting radially internal face, said first circumferential surface having a radial rigidity, wherein said radial rigidity of the first circumferential surface against a radial compression force applied thereto by a shaft varies in a circumferential direction such that the first circumferential surface includes a first radial rigidity bearing area and a second radial rigidity bearing area, said first radial rigidity bearing area being more rigid than said second radial rigidity bearing area; and a second circumferential surface;
   d. wherein the second circumferential surface is joined to the backing layer;
   e. wherein the radial rigidity of the first circumferential surface is adjusted by changing a thickness of at least one of the bearing layer and the backing layer;
   f. wherein the radial rigidity of a cylindrical surface of a housing bore into which the cylindrical sliding bearing is fitted against the radial compression force; varies in a circumferential direction whereby the cylindrical surface includes a first radial rigidity area and a second radial rigidity area, the first radial rigidity area being of higher rigidity than the second radial rigidity area, and wherein the second radial rigidity bearing area overlaps the first radial rigidity area as seen radially.

2. The cylindrical sliding bearing according to claim 1 wherein the sliding layer has a lower Young's modulus than the Young's modulus of the backing layer, and a thickness of the sliding layer at the lower radial rigidity bearing area is larger than a thickness of the sliding layer at the higher radial rigidity bearing area.

3. The cylindrical sliding bearing according to claim 1 wherein a lubricant film from the shaft applies a radial compression force to the first circumferential surface.

4. The cylindrical sliding bearing according to claim 1 wherein the sliding layer has a lower Young's modulus than the Young's modulus of the backing layer, and a thickness of the sliding layer at the lower radial rigidity bearing area is smaller than a thickness of the sliding layer at the higher radial rigidity bearing area.

5. The cylindrical sliding bearing according to claim 1 further comprising a housing bore having a cylindrical surface into which the cylindrical sliding bearing is fitted, wherein the housing bore includes a first member to be mounted on a second member, the radial rigidity of the first circumferential surface is a ratio of the radial compression force applied to the first circumferential surface by the shaft to a radial displacement of the shaft at the first circumferential surface along a direction of the radial compression force, obtainable when the shaft is supported on the first circumferential surface, the sliding bearing is fitted in a cylindrical surface, the radial displacement of the shaft is elastically generated in accordance with the radial compression force applied to the first circumferential surface, and the first member is mounted on the second member.

6. The cylindrical sliding bearing according to claim 1 wherein the cylindrical sliding bearing is situated within a housing bore having a cylindrical surface, wherein the housing bore includes a first member mounted on a second member, wherein the radial rigidity of the cylindrical surface against the radial compression force applied to the cylindrical surface through the cylindrical sliding bearing by a shaft varies in the circumferential direction, the radial rigidity of the cylindrical surface is a ratio of the radial compression forces applied to the cylindrical surface by a shaft to a radial displacement of the sliding bearing at the cylindrical surface along a direction of the radial compression force, this ratio being obtained when the shaft is supported on the first circumferential surface, the sliding bearing is fitted into the cylindrical surface, the radial displacement of the sliding bearing is elastically generated in accordance with the radial compression force applied to the cylindrical surface through the sliding bearing, and the first member is mounted on the second member.

7. A cylindrical sliding bearing, comprising:
   a. a bearing layer;
   b. a backing layer;
   c. the bearing layer including a first circumferential surface forming a shaft supporting radially internal face, said first circumferential surface having a radial rigidity, wherein said radial rigidity of the first circumferential surface against a radial compression force applied thereto by a shaft varies in a circumferential direction such that the first circumferential surface includes a first radial rigidity bearing area and a second radial rigidity bearing area, said first radial rigidity bearing area being more rigid than said second radial rigidity bearing area; and a second circumferential surface;

d. wherein the second circumferential surface is joined to the backing layer;

e. wherein the radial rigidity of the first circumferential surface is adjusted by changing a thickness of at least one of the bearing layer and the backing layer;

f. wherein a radial rigidity of a cylindrical surface of a bore housing the cylindrical sliding bearing against the radial compression force applied to the cylindrical surface varies in the circumferential direction so that the cylindrical surface includes a maximum radial rigidity point at which the radial rigidity of the cylindrical surface is maximum and the second radial rigidity bearing area is adapted to overlap the maximum radial rigidity point as seen radially.

8. A cylindrical sliding bearing, comprising:

a. a bearing layer;

b. a backing layer;

c. the bearing layer including a first circumferential surface forming a shaft supporting radially internal surface, said first circumferential surface having a radial rigidity, wherein said radial rigidity of the first circumferential surface against a radial compression force applied thereto by a shaft varies in a circumferential direction such that the first circumferential surface includes a first radial rigidity bearing area and a second radial rigidity bearing area, said first radial rigidity bearing area being more rigid than said second radial rigidity bearing area; and a second circumferential surface;

d. wherein the second circumferential surface is joined to the backing layer;

e. wherein the radial rigidity of the first circumferential surface is adjusted by changing a thickness of at least one of the bearing layer and the backing layer;

f. wherein the radial compression force applied to the first circumferential surface varies in the circumferential direction so that the first circumferential surface has a maximum bearing pressure point at which point a radial compression pressure generated by the radial compression force on the first circumferential surface is maximum, and the second radial rigidity bearing area is adapted to overlap the maximum bearing pressure point, as seen radially.

9. The cylindrical sliding bearing according to claim 1 wherein an area of less rigidity is adapted to be arranged at a circumferential position on the first circumferential surface, and at the first circumferential surface a pressure generated on the first circumferential surface for supporting a shaft on the first circumferential surface increases significantly.

* * * * *